United States Patent
Hu et al.

(10) Patent No.: US 9,143,690 B2
(45) Date of Patent: Sep. 22, 2015

(54) OPTICAL IMAGE STABILIZER

(71) Applicant: TDK Taiwan Corp., Taipei (TW)

(72) Inventors: Chao Chang Hu, Taoyuan County (TW); Fu Yuan Wu, Taoyuan County (TW); Jyun Jie Lin, Taoyuan County (TW)

(73) Assignee: TDK Taiwan Corp. (TW)

( * ) Notice: Subject to any disclaimer, the term of this patent is extended or adjusted under 35 U.S.C. 154(b) by 0 days.

(21) Appl. No.: 14/270,087

(22) Filed: May 5, 2014

(65) Prior Publication Data

US 2014/0333784 A1  Nov. 13, 2014

(51) Int. Cl.
  *H04N 5/228* (2006.01)
  *H04N 5/232* (2006.01)
  *G02B 27/64* (2006.01)

(52) U.S. Cl.
  CPC ............ *H04N 5/2328* (2013.01); *G02B 27/646* (2013.01); *H04N 5/23264* (2013.01)

(58) Field of Classification Search
  CPC . H04N 5/2328; H04N 5/23264; G02B 27/646

USPC ................ 348/208.99, 208.1–208.8, 208.11, 348/208.12
See application file for complete search history.

(56) References Cited

U.S. PATENT DOCUMENTS

| 2013/0021685 A1* | 1/2013 | Fan et al. ...................... 359/824 |
| 2013/0028581 A1* | 1/2013 | Yeung et al. .................... 396/75 |

\* cited by examiner

*Primary Examiner* — Yogesh Aggarwal

(57) ABSTRACT

An optical image stabilizer furnished in an image sensing module includes a casing having a compartment, a fixing plate fixed to the casing, a movable part supporter, a movable part connected to the movable part supporter, a coil, at least one magnet, at least one compensation module, a suspension module connecting the movable part, and a base. The coil furnished outside the movable part is corresponding to the magnet located on the inner surface of the movable part supporter. The base to support the casing is located on the image sensing module. The vertical distance between the compensation module and the image sensing module is larger than that between the coil and the image sensing module. A light inlet side of the movable part is near to the compensation module, while a light outlet side thereof is near to the image sensing module.

11 Claims, 11 Drawing Sheets

Cross section A-A

Cross section B-B

OPTICAL IMAGE STABILIZER

This application claims the benefit of Taiwan Patent Application Serial No. 102116700, filed May 10, 2013, the subject matter of which is incorporated herein by reference.

BACKGROUND OF INVENTION

1. Field of the Invention

The invention relates to an optical image stabilizer, and more particularly to the stabilizer that is able to improve and/or compensate kinetic deviations of the lens module while in focusing or zooming.

2. Description of the Prior Art

Digital photography technology has been widely applied to most of the portable electronic devices such as the cellular phones. Various miniaturized techniques in the lens module are involved to make all these applications possible; in particular, the voice coil motor (VCM) technique. The VCM introduces a combination of coiled magnets and spring plates to drive a lens to move back and forth along a photo axis for image-capturing, so as to perform auto-zooming and/or auto-focusing of the lens module. Further, in this trend of devices capable of high-level photographing functions, photographic quality and various camera functions are also demanded; such as thousand pixels, anti-hand shake ability and so on.

In an optical system composed of a lens module and an image-compensation module, such as a camera system or a video recorder system, hand shake or some external situations usually occur to bias the optical path so as to degrade the imaging upon the image-compensation module and further to obscure the formation of the images. A conventional resort to resolve this problem is to introduce a further compensation mechanism for overcoming possible shaking during the imaging. Such a compensation mechanism can be either digital or optical.

In the art, the digital compensation mechanism is to analyze and process the digital imaging data capturing by the image-compensation module, so as to obtain a clearer digital image. Such a mechanism is also usually called as a digital anti-shake mechanism. On the other hand, the optical compensation mechanism, usually called as an optical anti-shake mechanism, is to add a shake-compensation module upon the lens module or the image-compensation module. Currently, most of the optical anti-shake mechanisms in the market are consisted of plenty complicated or cumbersome components and thus are usually complicatedly structured, difficulty assembled, expensive, and hard to be further miniaturized. Obviously, a further improvement upon such the anti-shake mechanism is definitely necessary.

Referring to FIG. 1, an optical compensation mechanism in accordance with the Japan Patent No. 2002-207148 is schematically shown. The optical compensation mechanism includes four flexible steel strings $400k$-$403k$ to sustain a lens unit $203k$ upon a circuit board $301k$ having a central image sensor $300k$. The lens unit $203k$ further includes a lens $200k$ and a lens holder $202k$. The lens unit $203k$ can be a zooming or a focusing lens module. The lens $200k$ centrally located in the lens unit $203k$ can move back and forth with respect to the lens holder $202k$ along an optical axis $201k$. While in meeting a shake, a relative displacement between the lens unit $203k$ and the circuit board $301k$ would be generated. Then, through two relative displacement sensors $500k$, $501k$ and a position sensor $503k$, both the X-axial displacement and the Y-axial displacement between the lens unit $203k$ and the circuit board $301k$ can be transmitted to an anti-shake unit $504k$. According to the axial displacements, the anti-shake unit $504k$ controls and drives a shift unit $502k$ to perform a corresponding compensation movement upon the lens unit $203k$ with respect to the circuit board $301k$, such that obscure imaging due to the shake can be avoided in the image sensor $300k$.

Nevertheless, the aforesaid Japanese patent No. 2002-207148 is not only aiming at obscure imaging by hand-shaking, but also affecting the volume of apparatus mainly by the combination of the anti-shake unit $504k$ and the shift unit $502k$. As a result, the X-Y surface parallel to the lens unit $203k$ cannot be further reduced. Contrarily, the present invention herein is to thoroughly utilize the reduced-space concept to invent an optical image stabilizer to restrain X-axial and Y-axial deviations contributed by handshakes, and to reduce further apparatus's X-Y surface (so as to reduce as well the apparatus's volume). Thereby, parts for the imaging apparatus can be achieved at a state of lightweight, slimness, shortness and miniaturized in various manifolds.

SUMMARY OF THE INVENTION

Accordingly, it is the primary object of the present invention to provide an optical image stabilizer, in which an anti-handshake compensation module is introduced and located inside the movable part of the lens module, such that ill-imaging from possible handshake can be avoided and also the arrangement of the compensation module can be further modified to achieve the design purpose of lightweight, slimness, shortness and miniaturization.

In the present invention, the optical image stabilizer is furnished in an image sensing module and is defined with an X-axis direction, a Y-axis direction and a Z-axis direction. The optical image stabilizer comprises a casing, a fixing plate, a movable part, a movable part supporter, a coil, at least one magnet, at least one compensation module, a suspension module and a base. The casing has a compartment. The fixing plate is fixed inside to the casing.

The movable part is connected inside to the movable part supporter. The coil is furnished outside to the movable part and is corresponding to the magnet which is located on the inner surface of the movable part supporter. The suspension module is engaged with the fixing plate and the movable part supporter so as to hang the movable part (engaged with the movable part supporter) in the compartment inside the casing. The vertical distance between the compensation module and the image sensing module is larger than the vertical distance between the coil and the image sensing module. A light inlet side of the movable part is close to the compensation module, while a light outlet side of the movable part is close to the image sensing module.

All these objects are achieved by the optical image stabilizer described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to an optical image stabilizer. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
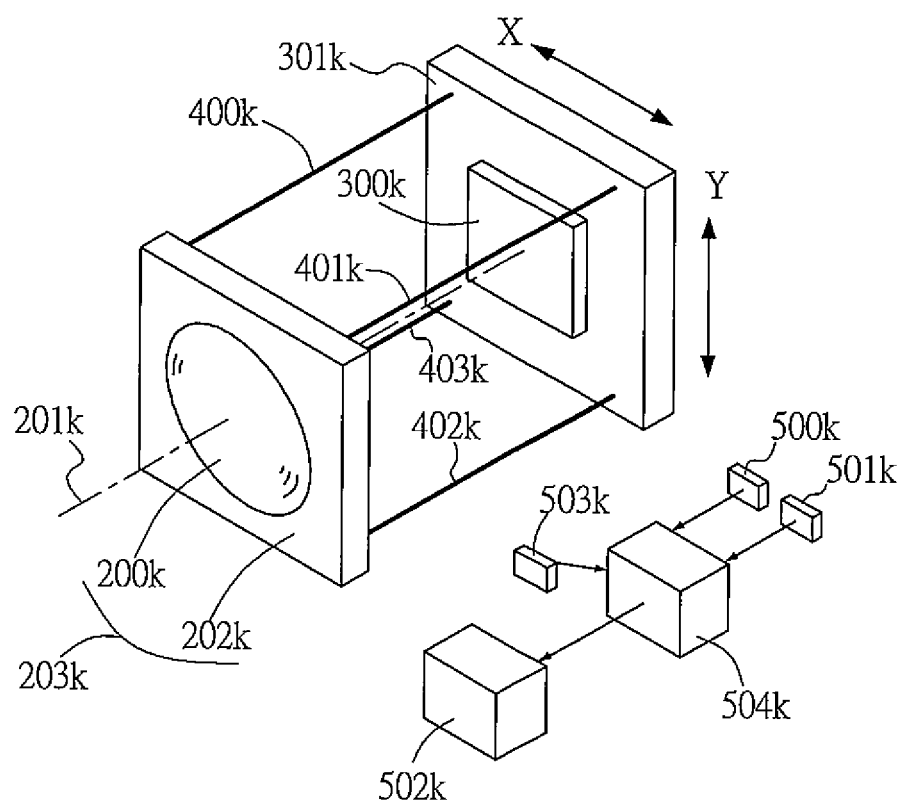
FIG. 1 shows explodedly the Japan Patent No. 2002-207148.
Figure 2:
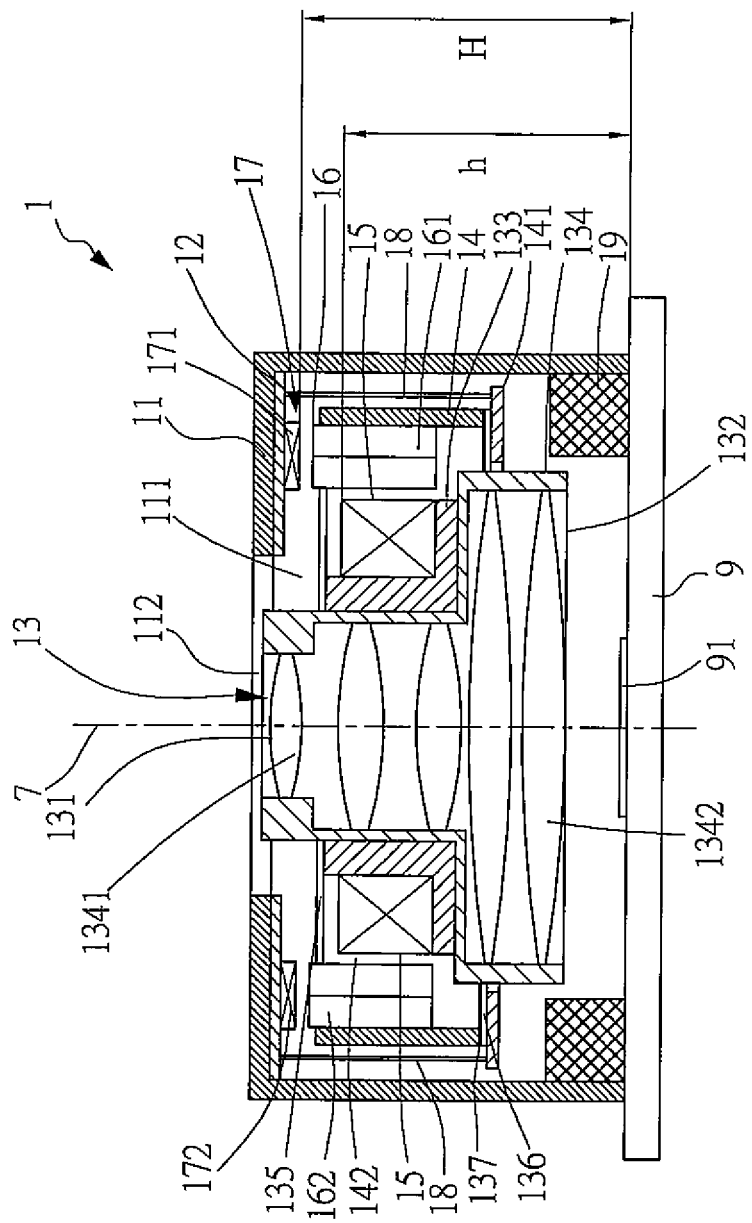
FIG. 2 is a cross-sectional view of a first embodiment of the optical image stabilizer in accordance with the present invention.
Figure 3:
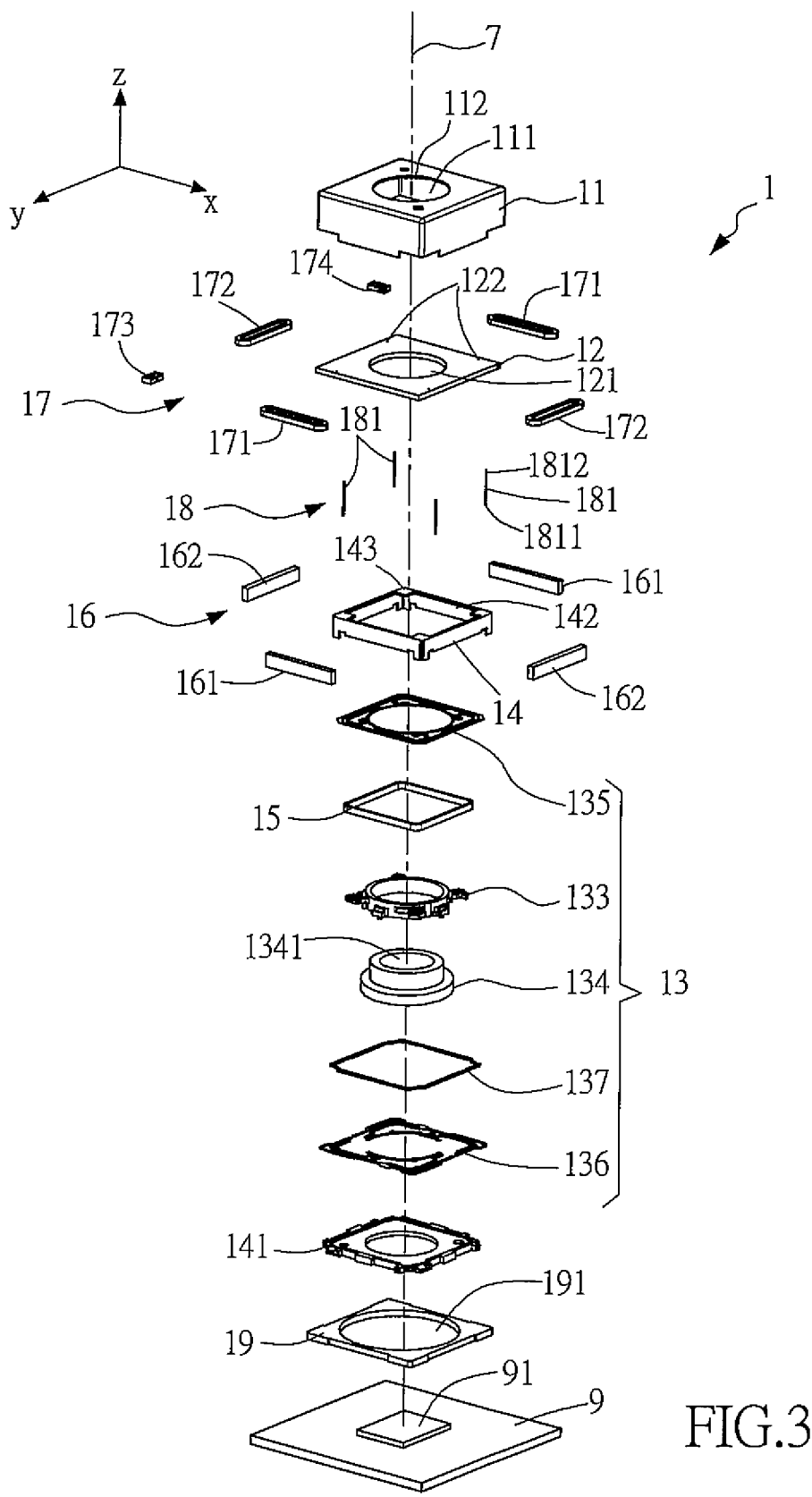
FIG. 3 is an exploded view of FIG. 2.
Figure 4:
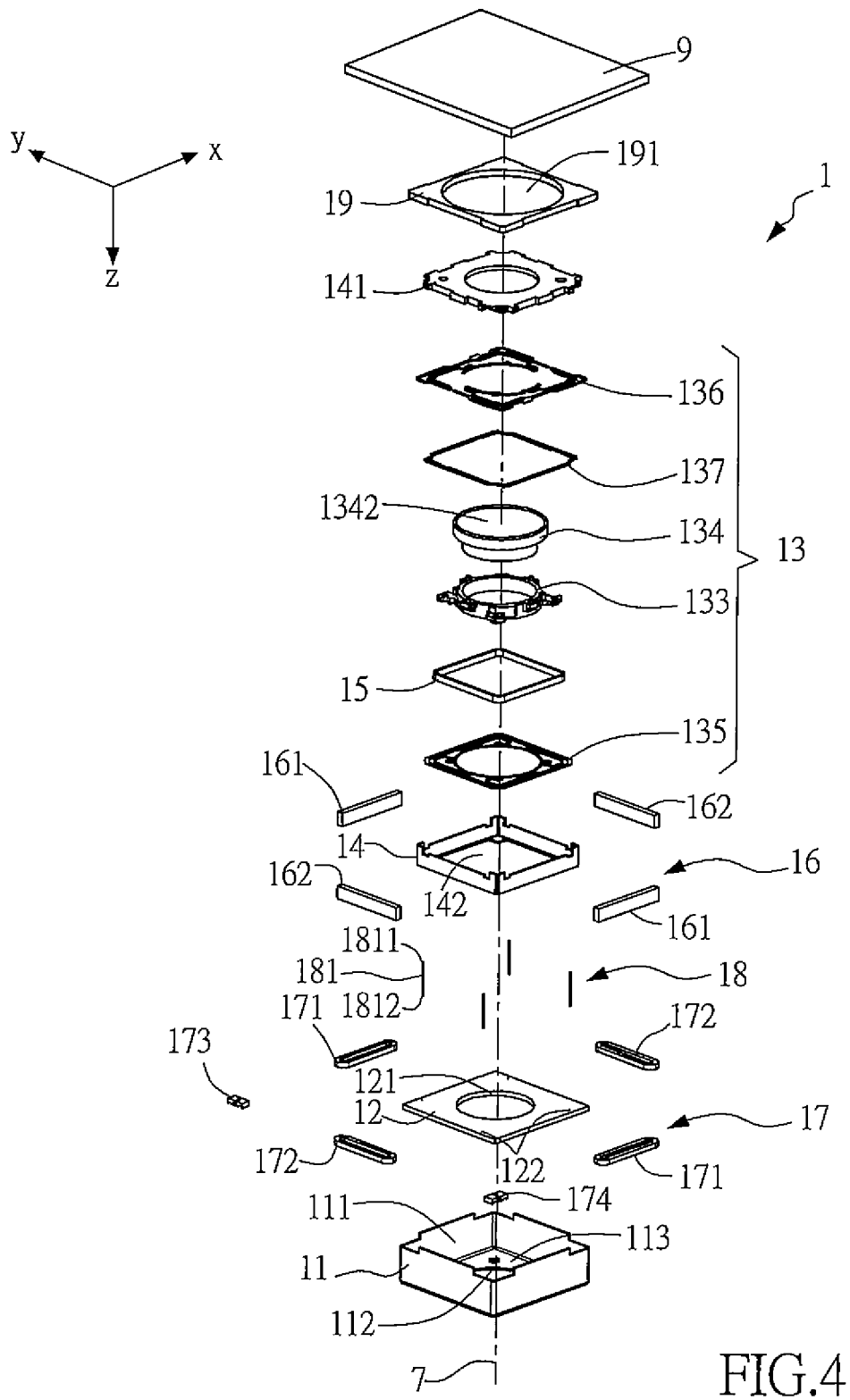
FIG. 4 is FIG. 3 at another viewing angle.
Figure 5:
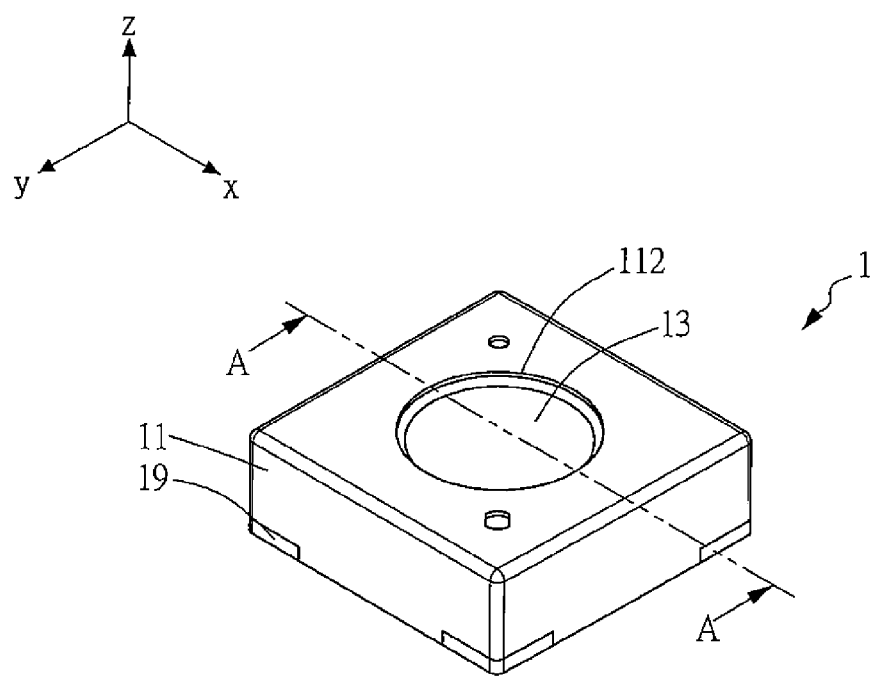
FIG. 5 is a perspective view of FIG. 2.
Figure 6:
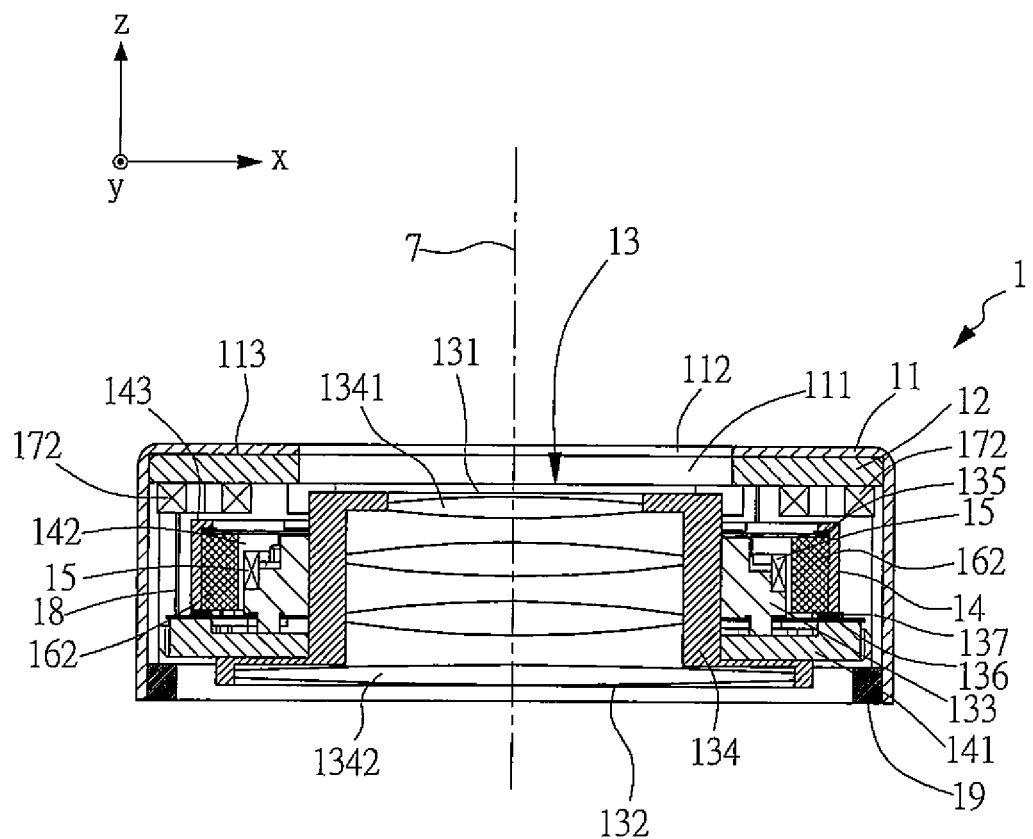
FIG. 6 is a cross-sectional view of FIG. 5 along line A-A.

Refer now to FIG. 2, FIG. 3, FIG. 4, FIG. 5 and FIG. 6, in which FIG. 2 is a cross-sectional view of a first embodiment of the optical image stabilizer in accordance with the present invention, FIG. 3 is an exploded view of FIG. 2, FIG. 4 is FIG. 3 at another viewing angle, FIG. 5 is a perspective view of FIG. 2, and FIG. 6 is a cross-sectional view of FIG. 5 along line A-A.

In the first embodiment of the present invention, the optical image stabilizer 1 is furnished in an image sensing module 9 and is defined with an X-axis direction, a Y-axis direction and a Z-axis direction. The optical image stabilizer 1 comprises a casing 11, a fixing plate 12, a movable part 13, a movable part supporter 14, a coil 15, at least one magnet 16, at least one compensation module 17, a suspension module 18 and a base 19.

The casing 11 has a compartment 111 and a penetration hole 112. The fixing plate 12 fixed inside to the compartment 111 of the casing 11 has a through hole 121 located in correspondence to the penetration hole 112. The movable part support 14 is formed as hollow frame structure having a cover plate 141 to form thereinside a preset space 142 for accommodating the movable part 13. The movable part 13 consisted of a lens 134 is engaged inside the movable part supporter 12 and further defines an optical axis (or photo axis) 7. The movable part 13 further has a light inlet side 131 and an opposing light outlet side 132. The coil 15 is furnished 1nd fixed outside to the movable part 13 and is corresponding to the at least one magnet 16 which is located on the inner surface of the movable part supporter 14. The at least one magnet 16 and the coil 15 are integrated to form a electromagnetic driving module for driving the movable part 13 to slide along the optical axis 7, i.e. to perform a linear Z-axis displacement with respect to the movable part supporter 14. The at least one compensation module 17 is mounted on the fixing plate 12 respective in position to the magnet 16. The suspension module 18 is engaged with both the movable part supporter 14 and the fixing plate 12 so as to hang the movable part 13 (engaged with the movable part supporter 14) over the fixing plate 12. The base 19 serves a fixation purpose for the casing 11 and is located above the image sensing module 9. Through a hole 191 of the base 19, the lens 134 of the movable part 13 can thus see a sensor chip 91 on the image sensing module 9. Namely, in the first embodiment of the present invention, the Z-axis vertical distance H between the compensation module 17 and the image sensing module 9 is larger than the Z-axis vertical distance h between the coil 15 and the image sensing module 9. The light inlet side 131 of the movable part 13 is close to the compensation module 17, while the light outlet side 132 of the movable part 13 is close to the image sensing module 9.

In this embodiment, the suspension module 18 suspends the movable part 12 engaged at the movable part supporter 14 inside the inner compartment 111 of the casing 11. By providing the suspension module 18 to the optical image stabilizer 1, unexpected Z-axis displacements leading to a permanent damage (plastic deformation) upon the movable part 13 can thus be avoided, while in meeting an accidental fall or a severe impact. In addition, by providing the compensation module 17 on the fixing plate 12, X-axis and Y-axis deviations of the movable part 12 after the accidental fall or the impact can be amended so as to achieve the invention object in anti-shaking. In practice, the Z-axis elastic coefficient of the movable part 13 or the movable part supporter 14 carried by the suspension module 18 should be higher than each of the X-axis elastic coefficient and the Y-axis elastic coefficients thereof. Upon such an arrangement, permanent deformations or damage at the connection of the suspension module 18 and the movable part supporter 14 can be avoided while the movable part 13 meets a Z-axis impact, and also optical performance of the lens inside the movable part 13 can be ensured without negative influence by unexpected Z-axis displacements at the suspension module 18 due to a strength problem under normal operations.

In the first embodiment of the present invention, the suspension module 18 includes a plurality (four in the figure) of lengthy spring elements 181 extended longitudinally along directions parallel to the Z axis at the rim of the movable part supporter 14. Each of the spring elements 181 has a first connection end 1811 and an opposing second connection end 1812 for connecting the movable part supporter 14 and the fixing plate 12, respectively. Thereby, the movable part supporter 14 can be Z-axial suspended over the fixing plate 12 and inside the compartment 111 of the casing. Namely, with each of the four corner spring elements 181 to penetrate through one respective fixation hole 213 at a corresponding corner of the movable part supporter 14, the movable part 13 carried by the movable part supporter 14 can then be suspended in the inner compartment 111 of the casing 11. Upon such an arrangement, sufficient buffering rooms for compensating unexpected impacts can be provided to the movable part 13. In the present invention, the spring element 181 can be one of metal springs, metal spring plates, plastic springs and poly elastomers.

In particular, the spring elements 181 are four lengthy threaded springs made of appropriate metals or other relevant materials and extend parallel to the Z axis with an equilibrium arrangement to penetrate four corners of the movable part supporter 14 via the respective fixation holes 122 at corresponding corners of the fixing plate 12. In addition, for the fixing plate 12 is engaged to a top place 113 inside the casing 11, the movable part 13 can be elastically suspended inside the inner compartment 111 by the four spring elements 181. Thus, to the movable part 13 as well as the movable part supporter 14, both X-axis and Y-axis displacement tolerances can be provided, and also slight Z-axis displacement tolerance, or say the buffering room, can be obtained. Accordingly, sufficient Z-axis impact strength can be provided to the movable part 13 engaged with the movable part supporter 14 so as to meet unexpected challenges from accidental falls of the optical system.

In the first embodiment of the present invention, the movable part 13 can be an auto-focusing module (typically named to the movable part 13 in the following description) or an auto-zooming module having the lens 134 defined with the optical axis 7 parallel to the Z axis. Of course, in the present invention, the movable part 13 can be also an ordinary lens module without any automation function. The surface of the auto-focusing module 13 is substantially parallel to the X-Y plane. The suspension module 18 is to hang the auto-focusing module 13 in a suspension manner and to maintain substantially the Z-axis arrangement of the casing 11, the auto-focusing module 13 and the fixing plate 12 along the same optical axis 7. Through the penetration hole 112 on the casing 11 and the hole 121 on the fixing plate 12, the auto-focusing module 13 can perform image capturing of external objects.

In this first embodiment of the present invention, the auto-focusing module 13 includes a lens carrier 133, a lens 134, an upper spring plate 135, a lower spring plate 136 and a washier plate 137. Preferably, the auto-focusing module 13 can include a VCM. Also, along the optical axis 7 (parallel to the Z axis), the lens carrier 133 carrying the lens 134 is mounted inside the movable part supporter 14 of the auto-focusing module 13. The coil 15 is to surround exteriorly the lens carrier 133 at a position corresponding to the respective magnet 16 (one or plural) mounted at the inner rim of the movable part supporter 14. Upon such an arrangement, the magnet 16 and the coil 15 can form a VCM electromagnetic driving module for driving the lens carrier 133 as well as the lens 134 to move linearly with respect to the movable part supporter 14 along the optical axis 7. The lens 134 is formed as a lens group including at least one small lens plate 1341 and at least one large lens plate 1342. The lens group is located at the optical axis 7 with the at least one large lens plate 1342 located at a position corresponding to the image sensing module 9 and close to the light outlet side 132 of the auto-focusing module 13 and with the at least one small lens plate 1341 located at a position corresponding to the at least large lens plate 1342 and close to the light inlet side 131.

In the first embodiment of the present invention, the at least one (plural) magnet 16 includes at least one X-axis magnet 161 (two shown in the figure), and at least one Y-axis magnet 162 (two shown in the figure). The two X-axis magnets 161 are oppositely mounted on the movable part supporter 14. The two Y-axis magnets 162 are also oppositely mounted on the movable part supporter 14 at an arrangement of neighboring to the two X-axis magnets 161 by forming a magnet square as shown in FIG. 3 or FIG. 4. By applying different input currents to the coil 15 so as to induce corresponding magnetic fields among the X-axis magnets 161 and the Y-axis magnets 162, the lens carrier 133 can then be driven to slide back and forth along the optical axis 7. Thereby, the purpose of zooming or focusing can then be achieved. The lens carrier 133 installed into the preset room 142 inside the movable part supporter 14 is elastically clamped by respective inner elastic ribs of the upper spring plate 135 and the lower spring plate 136, in which the lower spring plate 136 is fixed inside to the movable part supporter 14 via the washier plate 137. Namely, the washier plate 137 is fixed between the lower spring plate 136 and the movable part supporter 14 so as to obtain functions of insulation. The upper spring plate 135 and the lower spring plate 136 are thin elastic hollow plates made of appropriate metallic materials, and can be produced by a stamping process, an etching process, an electro-discharging process, a laser cutting, or any the like. The upper cover 141 is engaged with the movable part supporter 14 so as to form in between an allowable motion space for the lens carrier 133 to move thereinside. In the first embodiment of the present invention as shown from FIG. 2 to FIG. 6, the upper cover 141 and the lower spring platev 136 are two independent elements. However, in another embodiment not shown herein, the upper cover 141 and the lower spring platev 136 can be integrated as a unique piece. Thereby, the upper cover 141 or the lower spring plate 16 can then be equipped with functions of Z-axis displacement buffering, electricity conduction and stroke restraint of the lens carrier 133. Similarly, though the fixing plate 122 and the upper spring plate 135 in the first embodiment are two independent elements, yet in another embodiment not shown herein, the fixing plate 122 and the upper spring plate 135 can be integrated into a unique piece; such that the fixing plate 122 or the upper spring plate 135 can perform both the stroke restraint of the lens carrier 122 and the location of the spring elements 181 to the four respective corners.

The compensation module 17, located at the same optical axis 7 at a position in correspondence to the magnet 16 fixed on the movable part supporter 14, is at least to compensate possible impact-induced deviations of the movable part 13 at the X-axis and Y-axis directions. The compensation module 17 further includes at least one X-axis magnet-driving coil 171 (two shown in the figure), at least one Y-axis magnet-driving coil 172 (two shown in the figure), an X-axis displacement sensor 173 and a Y-axis displacement sensor 137.

The two parallel Y-axis magnet-driving coils 172 and the two parallel X-axial magnet-driving coils 171 are paired to form another coil square on the fixing plate 12 at a position in facing the magnetic square by having the X-axis magnets 161 and the Y-axis magnets 162 to account for the X-axial magnet-driving coils 171 and the Y-axial magnet-driving coils 172, respectively.

The X-axis displacement sensor 173 and the Y-axis displacement sensor 174 are both located on the fixing plate 12 to detect the X-axis deviation and the Y-axis deviation of the movable part 13, respectively. In the present invention, the X-axis displacement sensor 173 and the Y-axis displacement sensor 174 can be magnetic sensors, optical sensors, and/or other conventional displacement sensors. For the magnetic sensors, the Hall sensors, the magneto-resistive (MR) sensors, the fluxgate sensors, and the like can be applicable. For the optical sensor, the optical position detectors, the optical encoders and the like can be applicable. In the case that the X-axis displacement sensor 173 and the Y-axis displacement sensor 174 are both optical sensors, the X-axis displacement sensor 173 and the Y-axis displacement sensor 174 both can be located on the fixing plate 12 at positions corresponding to one bottom place of the movable part supporter 14 which having a light-reflective function. In the case that the X-axis displacement sensor 173 and the Y-axis displacement sensor 174 are both magnetic sensors, optical sensors, the X-axis displacement sensor 173 and the Y-axis displacement sensor 174 both can be located on the fixing plate 12 at positions corresponding to one of the two X-axis magnets 161, and also the Y-axis displacement sensor 174 is located on the fixing plate 12 at a position corresponding to one of the Y-axis magnets 162 so as to detect individual displacement deviations of the X-axis magnets 161 and the Y-axis magnets 162. Upon each of the aforesaid arrangements, the flexibility provided by the spring elements 181 provides both the gravity supports and the X-axis/Y-axis displacement corrections for the auto-focusing module 13. Thus, by having the X-axis displacement sensor 173 and the Y-axis displacement sensor 174 to detect the horizontal shake-induced deviations between the auto-focusing module 13 and the fixing plate 12, and by having the two X-axis magnet-driving coils 171 and the two Y-axis magnet-driving coils 172 on the fixing plate 12 to energize the respective two X-axis magnets 161 and two Y-axis magnets 162 mounted on the movable part supporter 14, the X-axis and the Y-axis deviations of the auto-focusing module 13 perpendicular to the optical axis 7 can then be compensated so as to obtain objects in anti-hand shaking for better imaging.

In the first embodiment of the present invention shown in FIG. 2 thru FIG. 6, the compensation module 17 of the optical image stabilizer 1 is preferably embodied as a dynamic electromagnetic compensation module. Yet, in other embodiments snot shown herein, the compensation module 17 can be also embodied as a piezoelectric module, a pneumatic module, or any the like.

Namely, the compensation module 17 and the coil 15 of the optical image stabilizer 1 in accordance with the present invention are to action upon the same magnet 16 to perform the after-shake deviation compensation of the X-axis and the Y-axis displacements and also to drive the lens 134 to focus or zoom along the Z axis. Further, by having an appropriate arrangement in sizes of the small lens plate 1341 and the large lens plate 1342, the area reduction upon the optical image stabilizer 1 on the X-Y plane can be obtained. That is, by following a location and size order to arrange the small lens plates 1341 and then the large lens plate 1342 from the light-inlet side 131 of the lens 134 to the light-outlet side 132 along the optical axis 7, the lens group can then be conical formed so as to save rooms for accommodating the lens carrier 133 fixing the coil 15 and the corresponding magnet 16 and compensation module 17. In addition, by having the large lens plate 1342 to locate between the image sensing module 9 and the upper cover 141, the area of the optical image stabilizer 1 on the X-Y plane can be further reduced. Hence, the design purpose of the overall volume reduction can thus be achieved.

In the following description, two more embodiments of the present invention are present. For most of the elements of the following embodiments are resembled to those of the first embodiment as described above, the same names and numbers would be directly assigned to those elements that have been described in the first embodiment. For those elements of the following two embodiments that are slightly different to the corresponding elements in the first embodiment, a tailing English letter will be added to the respective numbers though the same names and numbers are still given. Details for those elements of the following two embodiments that are totally resembled to or slightly different to the corresponding elements in the first embodiment are omitted herein.

Figure 7:
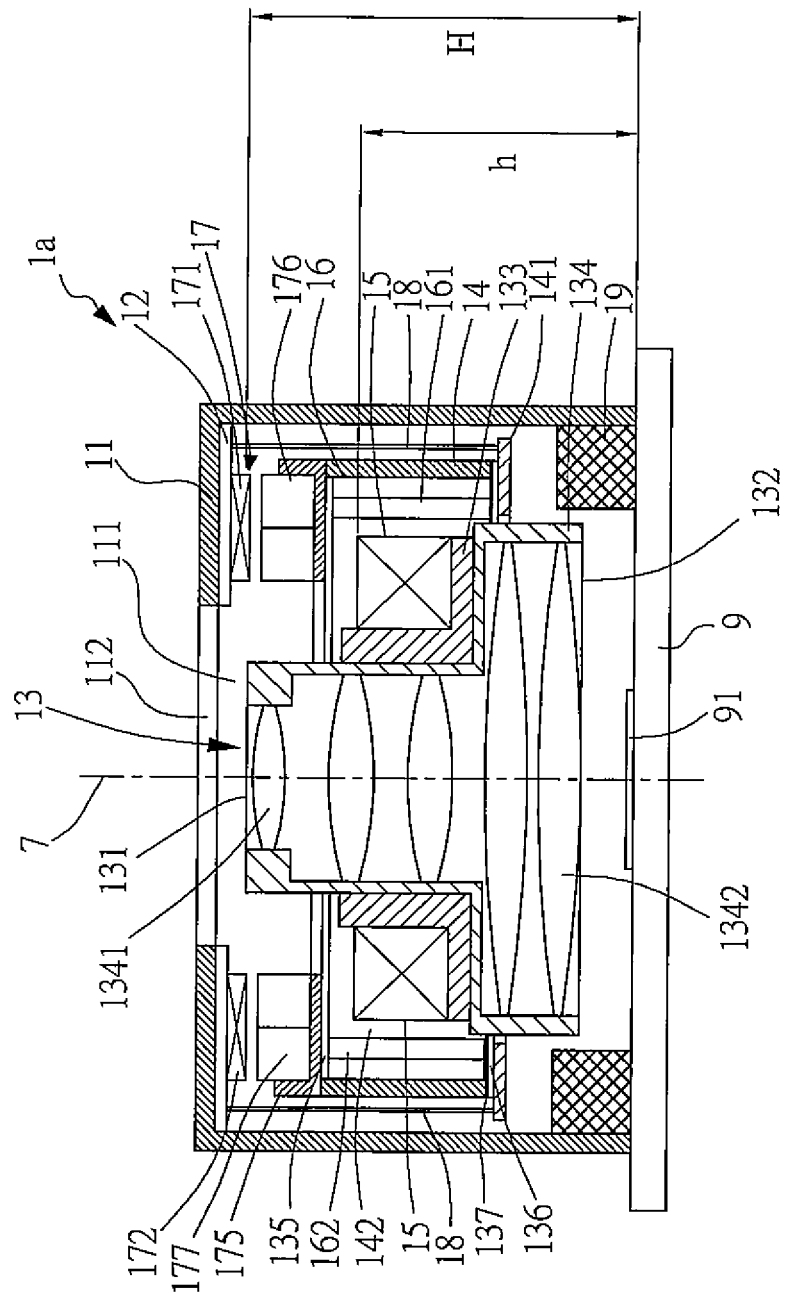
FIG. 7 is a cross-sectional view of a second embodiment of the optical image stabilizer in accordance with the present invention.
Figure 8:
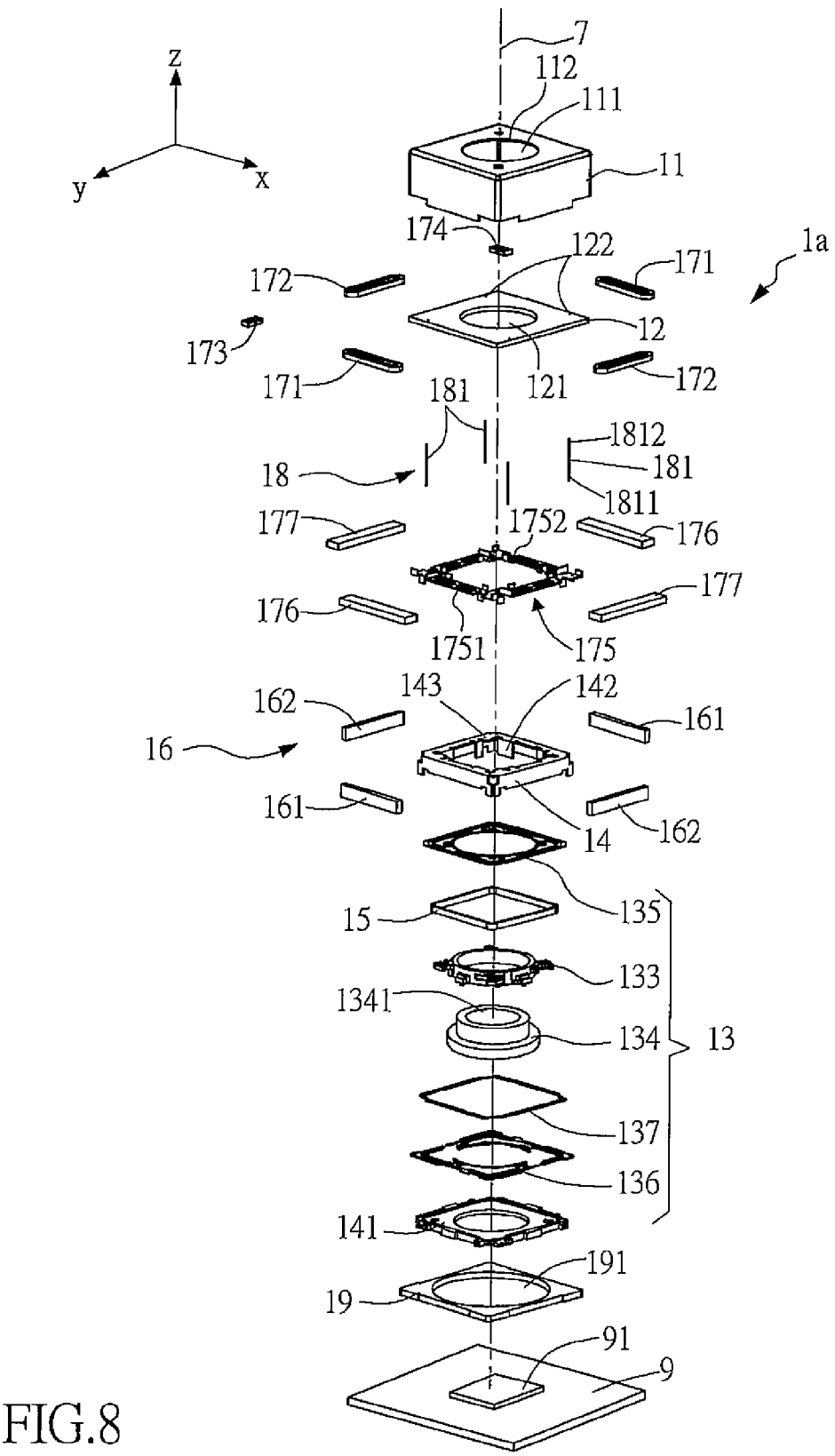
FIG. 8 is an exploded view of FIG. 7.
Figure 9:
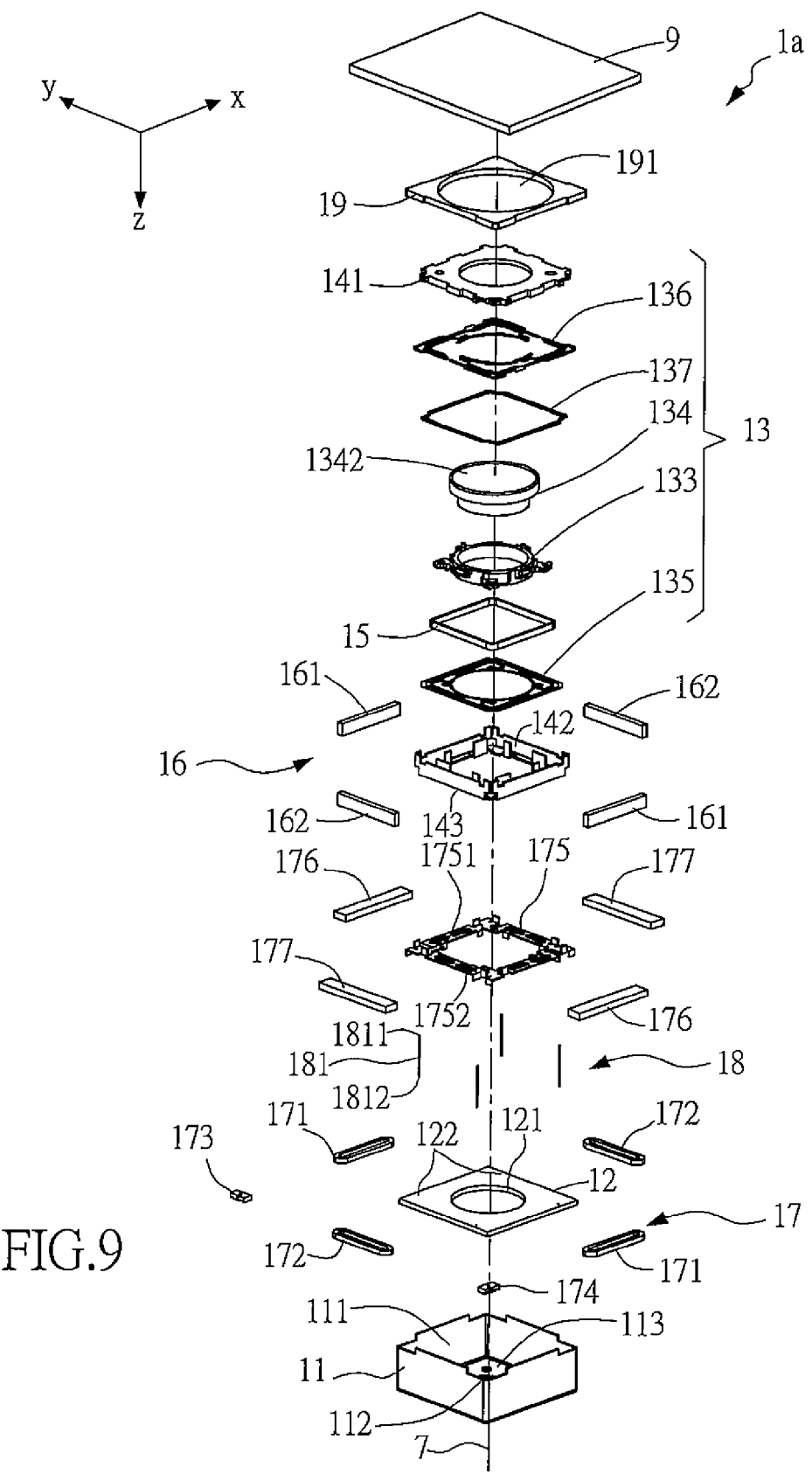
FIG. 9 is FIG. 8 at another viewing angle.
Figure 10:
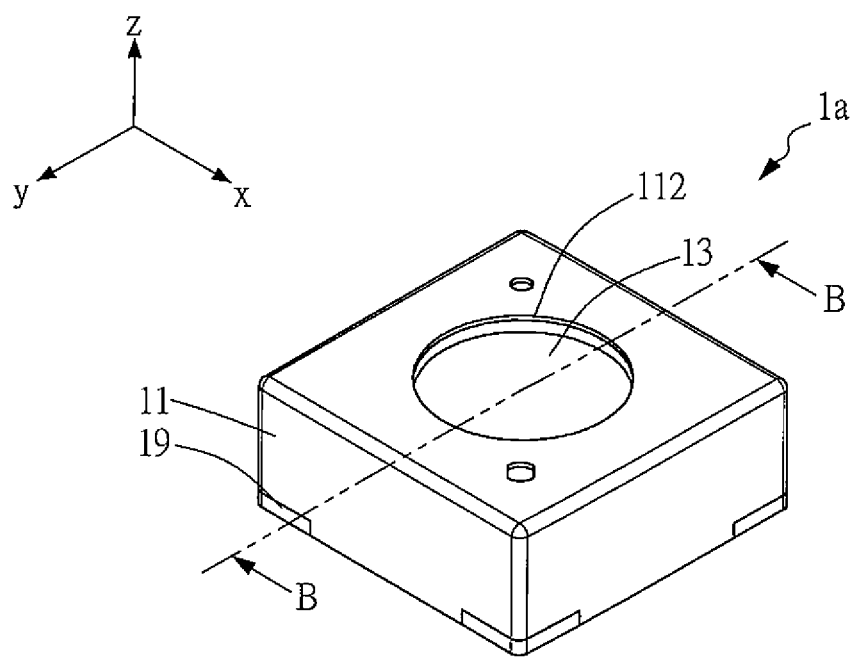
FIG. 10 is a perspective view of FIG. 7.
Figure 11:
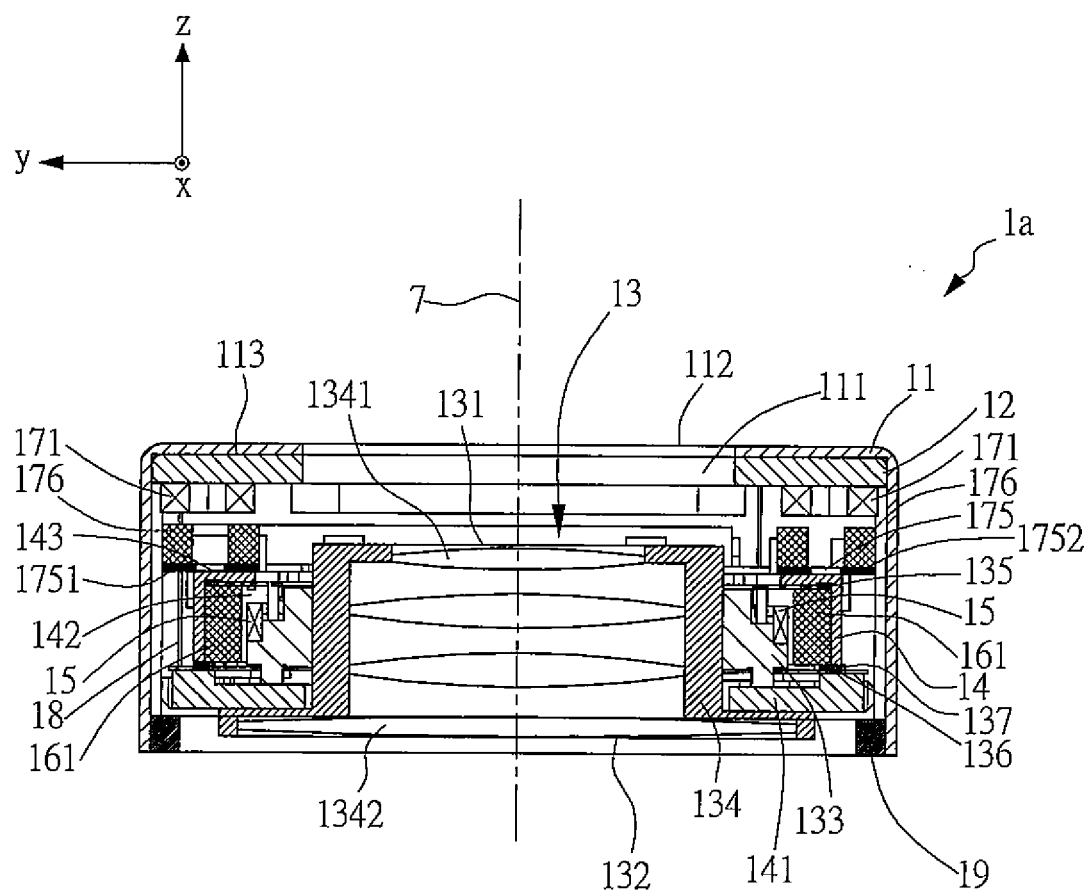
FIG. 11 is a cross-sectional view of FIG. 10 along line B-B.

Refer now to FIG. 7, FIG. 8, FIG. 9, FIG. 10 and FIG. 11, in which FIG. 7 is a cross-sectional view of a second embodiment of the optical image stabilizer in accordance with the present invention, FIG. 8 is an exploded view of FIG. 7, FIG. 9 is FIG. 8 at another viewing angle, FIG. 10 is a perspective view of FIG. 7, and FIG. 11 is a cross-sectional view of FIG. 10 along line B-B. For the second embodiment of the suspension mechanism shown from FIG. 7 thru FIG. 11 is largely resembled to the first embodiment shown from FIG. 2 thru FIG. 6, details for the common elements in between would be omitted.

The major difference between the aforesaid first embodiment and the current second embodiment is that, in this second embodiment, the compensation module 17 of the optical image stabilizer 1 further includes a magnet carrier 175, at least one X-axis driving magnet 176 (two shown in the figure) and at least one Y-axis driving magnet 177 (two shown in the figure). The magnet carrier 175 further has a first surface 1751 and a second surface 1752, in which the first surface 1751 is fixed onto a bottom surface 143 of the movable part supporter 14 so as to have the second surface 1752 to face the fixing plate 12. The two X-axis driving magnets 176, mounted on the second surface 1752 of the magnet carrier 175 by corresponding to the two X-axis magnet-driving coils 171. The two Y-axis driving magnets 177, mounted on the second surface 1752 of the magnet carrier 175 by neighboring to the two X-axis driving magnets 176 and by corresponding to the two Y-axis magnet-driving coils 172. Namely, the magnet carrier 175 is to fix separately the X-axis driving magnet 176 and the Y-axis driving magnet 177, and to engage the bottom surface 143 of the movable part supporter 14 through the first surface 1751 so as to correspond in positions to the X-axis magnet-driving coils 171 and the Y-axis magnet-driving coils 172. Through the X-axis magnet-driving coils 171 and the Y-axis magnet-driving coils 172 to drive the X-axis driving magnets 176 and the Y-axis driving magnets 177, the horizontal X-axis and the Y-axis deviations of the auto-focusing module 13 perpendicular to the optical axis 7 can then be compensated so as to obtain objects in anti-hand shaking for better imaging.

Namely, in the second embodiment of the present invention, the coil 15 of the optical image stabilizer 1a is to drive the magnet 16 and so the lens 134 to perform the Z-axis zooming or focusing. The X-axis magnet-driving coils 171 and the Y-axis magnet-driving coils 172 on the fixing plate 12 is specifically introduced to drive the X-axis driving magnets 176 and the Y-axis driving magnets 177 to perform the compensation of the after-shake X-axis and Y-axis deviations.

While the present invention has been particularly shown and described with reference to a preferred embodiment, it will be understood by those skilled in the art that various changes in form and detail may be without departing from the spirit and scope of the present invention.

What is claimed is:

1. An optical image stabilizer, furnished in an image sensing module and defined with an X-axis direction, a Y-axis direction and a Z-axis direction, comprising:
    a fixing plate;
    a movable part, defining an optical axis, further including a light inlet side and a light outlet side; the optical axis being parallel to the Z-axis direction;
    a movable part supporter, having an interior room for the movable part to be accommodated thereinside;
    a coil, furnished outside the movable part;
    at least one magnet, located on an inner surface of the movable part supporter by corresponding to the coil, wherein the at least one magnet and the coil are integrated to form an electromagnetic driving module for driving the movable part to undergo a linear Z-axial motion along the optical axis with respect to the movable part supporter; and
    at least one compensation module, mounted on the fixing plate by corresponding to the at least one magnet;
    wherein a distance along said Z-axial direction between the compensation module and the image sensing module is larger than another distance along the Z-axial direction between the coil and the image sensing module, the light inlet side of the movable part is near to the compensation module, and the light outlet side of the movable part is near to the image sensing module.

2. The optical image stabilizer according to claim 1, further comprising:
    a casing, having a compartment; the fixing plate being fixed inside to the casing;
    a suspension module, connected with the movable part supporter and the fixing plate by hanging the movable part engaged at the movable part supporter over the fixing plate; and
    a base, located on the image sensing module and mounting the casing.

3. The optical image stabilizer according to claim 2, wherein the suspension module includes a plurality of lengthy spring elements extending individually along directions parallel to the Z-axis direction, each of the spring elements having thereof a first connection end and an opposing second connection end to connect respectively with the movable part supporter and the fixing plate so as to suspend the movable part supporter parallel to the Z-axis direction inside the compartment by the plurality of spring elements.

4. The optical image stabilizer according to claim 3, wherein the suspension module allows the movable part supporter to displace along the X-axis direction and the Y-axis direction with respect to the fixing plate, and also allows the movable part supporter to displace along the Z-axis direction with respect to the fixing plate.

5. The optical image stabilizer according to claim 3, wherein each of the plurality of spring elements is one of metal springs, metal spring plates, plastic springs and poly elastomers, and is located by penetration to a respective fixation hole at corresponding one of four corners of the movable part supporter.

6. The optical image stabilizer according to claim 2, wherein the at least one magnet further includes:
  two X-axis magnets, mounted on the movable part supporter; and
  two Y-axis magnets, mounted also on the movable part supporter in a manner to form a magnet square with the two X-axis magnets.

7. The optical image stabilizer according to claim 6, wherein the compensation module further includes:
  two X-axis magnet-driving coils, mounted on the fixing plate at places corresponding to the two X-axis magnets;
  two Y-axis magnet-driving coils, mounted on the fixing plate at places corresponding to the two Y-axis magnets and in a manner to form a coil square with the two X-axis magnet-driving coils;
  an X-axis displacement sensor, located on the fixing plate to detect an X-axis deviation of the movable part; and
  a Y-axis displacement sensor, located on the fixing plate to detect a Y-axis deviation of the movable part.

8. The optical image stabilizer according to claim 7, wherein the compensation module further includes:
  a magnet carrier, further having a first surface and a second surface, the first surface being fixed onto the movable part supporter so as to have the second surface to face the fixing plate;
  two X-axis driving magnets, mounted on the second surface of the magnet carrier by corresponding to the two X-axis magnet-driving coils; and
  two Y-axis driving magnets, mounted on the second surface of the magnet carrier by neighboring to the two X-axis driving magnets and by corresponding to the two Y-axis magnet-driving coils.

9. The optical image stabilizer according to claim 2, wherein the movable part further includes:
  a lens carrier, mounted inside the movable part supporter and wound exteriorly by the coil;
  a lens, mounted at the optical axis inside the lens carrier;
  an upper spring plate, fixed to the movable part supporter;
  lens carrier at a position between the upper cover and the lens carrier an upper cover, engaged with the base frame so as to form in between an allowable motion space for the lens carrier to move thereinside;
  a lower spring plate, located inside the movable part supporter to elastically clamp the lens carrier with the upper spring plate; and
  a washier plate, mounted between the lower spring plate and the movable part supporter.

10. The optical image stabilizer according to claim 9, wherein the lens is formed as a lens group including at least one small lens plate and at least one large lens plate, wherein the lens group is located at the optical axis with the at least one large lens plate located at a position corresponding to the image sensing module and close to the light outlet side and with the at least one small lens plate located at a position corresponding to the at least large lens plate and close to the light inlet side.

11. The optical image stabilizer according to claim 8, wherein each of the X-axis displacement sensor and the Y-axis displacement sensor is one of a magnetic sensor and an optical sensor, the magnetic sensor being one of a Hall sensor, a magneto-resistive (MR) sensor and a fluxgate sensor, the optical sensor being one of an optical position detector and an optical encoder;
  wherein, in the case that the X-axis displacement sensor and the Y-axis displacement sensor are both magnetic sensors, the X-axis displacement sensor is located on the base at a position corresponding to one of the two X-axis magnets, and the Y-axis displacement sensor is located on the fixing plate at another position corresponding to one of the two Y-axis magnets;
  wherein, in the case that the X-axis displacement sensor and the Y-axis displacement sensor are both optical sensors, the X-axis displacement sensor and the Y-axis displacement sensor are located on the fixing plate at respective places to face the movable part.

\* \* \* \* \*